(12) United States Patent
Urabe

(10) Patent No.: US 7,935,019 B2
(45) Date of Patent: May 3, 2011

(54) BICYCLE HUB TRANSMISSION

(75) Inventor: Hiroyuki Urabe, Osaka (JP)

(73) Assignee: Shimano Inc., Osaka (JP)

( * ) Notice: Subject to any disclaimer, the term of this patent is extended or adjusted under 35 U.S.C. 154(b) by 662 days.

(21) Appl. No.: 12/034,215

(22) Filed: Feb. 20, 2008

(65) Prior Publication Data

US 2008/0227588 A1 Sep. 18, 2008

(30) Foreign Application Priority Data

Mar. 12, 2007 (EP) .................................... 07005057

(51) Int. Cl.
*F16H 3/44* (2006.01)

(52) U.S. Cl. ..................................................... 475/297

(58) Field of Classification Search .................. 475/269, 475/296, 297, 298, 299, 330
See application file for complete search history.

(56) References Cited

U.S. PATENT DOCUMENTS

| 4,651,853 | A | * | 3/1987 | Bergles | ...................... 192/217.4 |
| 4,721,013 | A | | 1/1988 | Steuer et al. | |
| RE33,058 | E | * | 9/1989 | Steuer et al. | .................. 475/289 |
| 5,399,128 | A | | 3/1995 | Nurnberber | |
| 5,785,625 | A | | 7/1998 | Matsuo et al. | |
| 5,813,937 | A | | 9/1998 | Rickels | |
| 5,855,530 | A | | 1/1999 | Huang et al. | |
| 6,325,739 | B1 | | 12/2001 | Hino | |
| 2006/0229155 | A1 | * | 10/2006 | Okouchi | ....................... 475/269 |

FOREIGN PATENT DOCUMENTS

| EP | 0 679 570 A2 | 11/1995 |
| EP | 1 112 922 A2 | 7/2001 |
| GB | 2 275 512 A | 8/1994 |
| WO | WO-95/31365 A1 | 11/1995 |

* cited by examiner

*Primary Examiner* — Roger Pang
(74) *Attorney, Agent, or Firm* — Global IP Counselors, LLP

(57) ABSTRACT

A bicycle hub transmission basically includes a hub axle, a driver, a hub shell, a planetary gear mechanism and a clutch. The driver is rotatably supported relative to the hub axle. The hub shell is rotatably supported relative to the driver. The planetary gear mechanism is disposed between the driver and the hub shell for communicating rotational power from the driver to the hub shell through a plurality of power transmission paths. The clutch is arranged for actuating the planetary gear mechanism to select a different gear. The clutch includes at least one clutch plate which is non-rotatably supported by the hub axle and axially movable relative to the hub axle to selectively engage with and disengage from at least one sun gear of the planetary gear mechanism.

12 Claims, 5 Drawing Sheets

BICYCLE HUB TRANSMISSION

CROSS-REFERENCE TO RELATED APPLICATIONS

This application claims priority under 35 U.S.C. §119 to European Patent Application No. 07005057.0, filed Mar. 12, 2007. The entire disclosure of European Patent Application No. 07005057.0 is hereby incorporated herein by reference.

BACKGROUND OF THE INVENTION

1. Field of the Invention

This invention generally relates to a hub transmission for a bicycle. More specifically, the present invention relates to an internally geared bicycle hub transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Internally-mounted multi-speed hub transmissions form part of the rear wheel of a bicycle and include a hub axle that is mounted to the bicycle frame, a driver rotatably supported by the hub axle for receiving a pedalling force, and a hub shell rotatably supported by the hub axle. A power transmission mechanism is disposed between the driver and the hub shell for communicating rotational power from the driver to the hub shell through a plurality of power transmission paths. The hub transmission further includes a clutch for actuating the power transmission mechanism to select different gear ratios.

The power transmission mechanism ordinarily includes a planetary gear mechanism including several sun gears, at least one ring gear and a planet gear carrier each of which is rotatably supported by the hub axle. Several planet gears are rotatably supported by the planet gear carrier meshing with the sun gears and the ring gears. To change the power transmission paths and the corresponding gear ratios, the aforementioned various gear components are selectively non-rotatably coupled with each other by operating the clutch.

One example of an internal hub transmission is disclosed in European Patent No. 0 679 570 B2. The internal hub transmission of this publication is one which includes a planetary gear mechanism including three sun gears, three planetary gears which mesh with the sun gears and a ring gear which meshes with the planet gears. To select different power transmission paths, it is possible to selectively lock the three sun gears by pawls which are installed in the inside-circumferential parts of the respective sun gears and which are capable of engaging with the inside surface of the respective sun gear through the operation of springs. A sleeve is inserted into the outer circumference of the hub axle which can be caused to rotate thereby coupling/decoupling the respective sun gears.

The arrangement of the pawl shifting clutch structure wherein the pawls and the sleeve are disposed between the fixed hub axle and the inside of the respective sun gears leads to a comparatively large diameter of the hub shell. Moreover, the control of the pawls by the sleeve is relatively complicated.

European Patent No. 0 679 570 B2 further discloses an internal hub transmission which includes a planetary gear mechanism including a sun gear integrally formed with the hub axle, a set of planetary gears meshing with the sun gear and a ring gear which meshes with the planetary gears. The ring gear is further coupled with the driver by a clutch. To select different gear ratios, a clutch mechanism is provided which includes a clutch member installed around the outer circumference of the hub axle so that the clutch member is free to move in an axial direction as well as in a rotational direction. The clutch member meshes with the driver and is engagable with a planetary gear carrier by axially moving the clutch member by a rod connected with the clutch member.

The ring gear which is designed to allow a movement towards the drive part caused by pushing the rod via the clutch member, when the transmission path changes from a directly coupled transmission path to a speed reducing transmission path, requires a comparatively big and heavy design which increases the weight of the internal hub gear. Moreover, a relatively strong force is required to operate the push rod when the transmission path changes from the directly-coupled transmission path to the speed-reducing transmission path.

In view of the above, it will be apparent to those skilled in the art from this disclosure that there exists a need for an improved bicycle hub transmission. This invention addresses this need in the art as well as other needs, which will become apparent to those skilled in the art from this disclosure.

SUMMARY OF THE INVENTION

One object of the present invention is to provide a hub transmission for a bicycle which includes a simple yet reliable structure.

The foregoing objects can basically be attained by providing a bicycle hub transmission that basically comprises a hub axle, a driver, a hub shell, a planetary gear mechanism and a clutch. The driver is rotatably supported relative to the hub axle. The hub shell is rotatably supported relative to the driver. The planetary gear mechanism is operatively disposed between the driver and the hub shell to selectively transmit rotational power from the driver to the hub shell through one a plurality of different power transmission paths. The clutch arranged to actuate the planetary gear mechanism to select one a plurality of different gear ratios. The clutch includes at least one clutch plate which is non-rotatably supported by the hub axle and axially movable relative to the hub axle to selectively engage with and disengage from at least one sun gear of the planetary gear mechanism.

The coupling/decoupling function of the clutch is achieved by the at least one clutch plate which is both non-rotatably supported by the hub axle and axially movable relative to the hub axle. Thereby, the respective sun gear can be connected with the hub axle, and, thus can be locked to activate the desired power transmission path. The non-rotatable and axially movable arrangement of the at least one clutch plate results in a gear mechanism which has a compact design and which requires little space.

Moreover, the hub transmission according to the present invention presents the advantage, that due to the comparatively simple structure the costs for manufacturing such a hub transmission are low. The reduced number of parts which are necessary to realize the hub transmission according to the present invention does not only lead to a cost reduction, but also facilitates the assembly of the hub transmission and reduces the risk of a failure of the components of the gear mechanism.

In accordance with one embodiment, the hub axle includes a longitudinal guiding part which is engaged with the clutch plate. The longitudinal guiding part allows an axial movement of the clutch plate while preventing at the same time the clutch plate from rotating in a peripheral direction around the hub axle. If the rotationally fixed clutch plate is engaged with a sun gear by axially moving the clutch plate into an engaging position, the coupled sun gear is rotationally locked. The longitudinal guiding part, therefore, provides for a simple structure to realize the support of the non-rotatable but axially movable clutch plate.

Preferably, the longitudinal guiding part comprises a serration on the outer peripheral surface thereof which is engaged with a correspondingly formed inner peripheral surface of the clutch plate. By the serration, a secure fixation in a rotational direction and a precise axial guidance of the clutch plate are provided.

Without being restricted to a specific number of clutch plates, it is preferred to apply two to four clutch plates each of which is non-rotatably supported by the hub axle and axially movable relative to the hub axle to selectively engage with and disengage from two to four sun gears of the planetary gear mechanism, respectively. Thus, the invention allows for designing a hub transmission with three to eight speed stages. Each of the respective clutch plates can be axially biased by a spring. Thereby an axial force is applied to the respectively each clutch plate which causes the axial movement of the clutch plate when shifting the planetary gear mechanism.

Preferably, a shift sleeve is provided which is at least axially movable relative to the hub axle and which is connected to a shift mechanism. The shift sleeve allows for actuating the clutch, specifically the clutch plate or the plurality of clutch plates. The shift sleeve can be arranged to rotatably move relative to the hub axle so that both an axial movement as well as a rotational movement of the shift sleeve are possible. The rotational and axial movability of the shift sleeve provides for different functions thereof, for example an actuating function for the clutch plate and a support function to amplify a shifting or operating force which is useful for shifting from a higher gear to a lower gear under a continuous pedalling force.

In a preferred embodiment, the shift sleeve includes stopper for the clutch plate. Such a configuration of the shift sleeve allows biasing the clutch plate against the shift sleeve thereby realizing a simple control of the axial movement of the clutch plate.

In a preferred embodiment, a rotation conversion structure is provided for converting a rotational movement of the shift sleeve into an axial movement of the shift sleeve thereby assisting the shifting of the planetary gear mechanism. The rotation conversion structure can comprise a cam portion provided on an inner peripheral surface of the shift sleeve and a key member which is connected to the shift mechanism and which is engagable with the cam portion.

If the key member and the cam portion engage with each other, a rotation of the shift sleeve is transformed into an axial movement thereof thereby forcing the shift sleeve and, thus, the clutch plate or the plurality of clutch plates in an axial direction of the hub axle.

The key member can be movably arranged in a guide groove which is formed in an outer peripheral surface of the hub axle and which is adapted to axially lock the key member in a state engaged with the cam portion. Thereby, the key member is used as a stationary counterpart for the cam portion which generates a reaction force in a longitudinal or axial direction of the hub axle.

To prevent an unintentional engagement of the key member with the cam portion, a spring may be provided between the shift sleeve and the key member that biases the key member in a direction away from the cam portion.

Preferably, the shift sleeve is engaged with a planet gear carrier of the planetary gear mechanism and/or the driver. This arrangement allows transmitting a rotational force to the shift sleeve which is converted into an axial force to support the axial movement of the shift sleeve and, hence, of the associated clutch plate(s). The shift mechanism may comprise a rod which is axially movably disposed in the hub axle and which is biased in a direction towards the driver.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
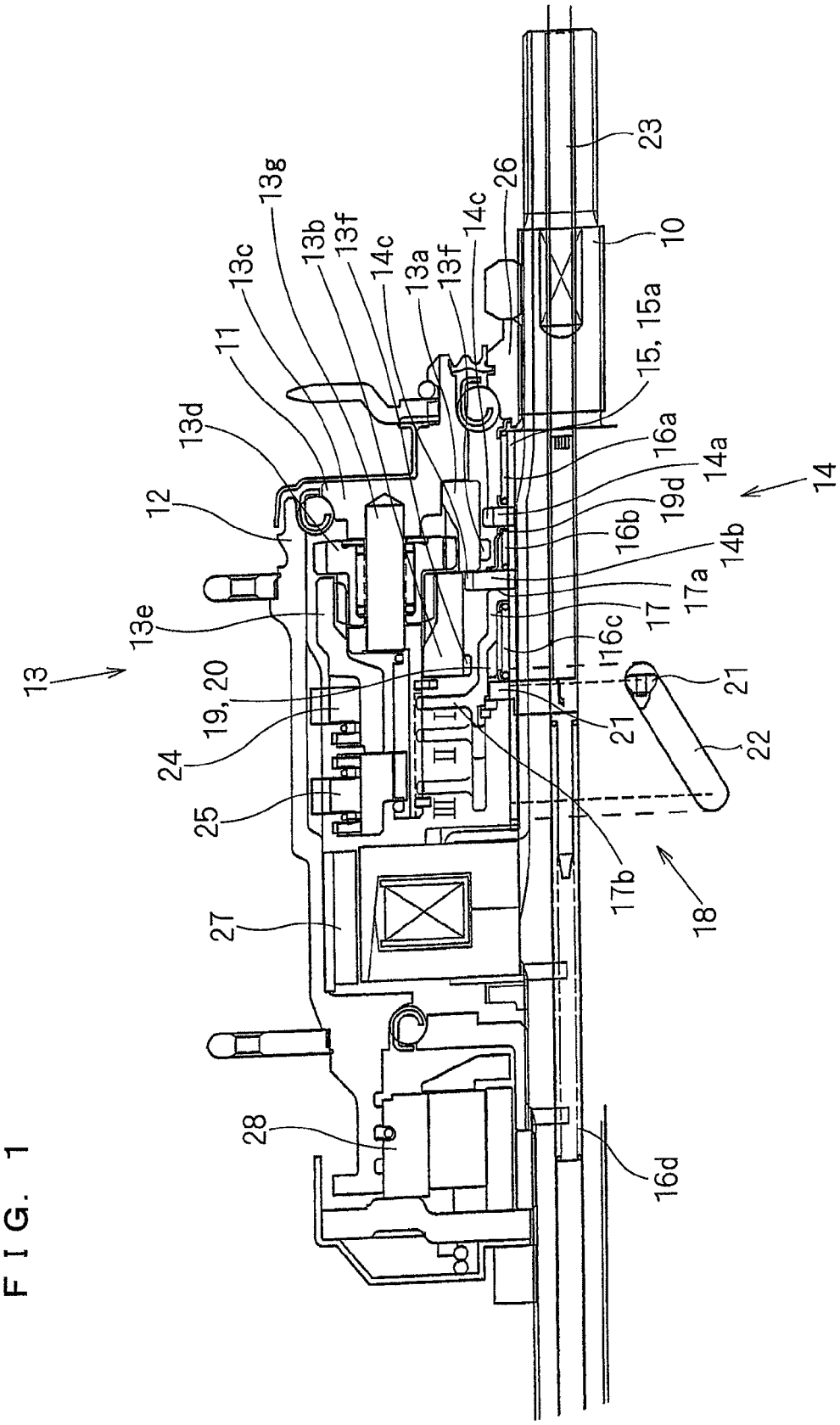
FIG. 1 is a simplified longitudinal cross-sectional view of a bicycle hub transmission according to one embodiment.

Referring initially to FIG. 1, a 3-speed bicycle hub transmission is illustrated in accordance with one preferred embodiment. The invention is not restricted to 3-speed hub transmissions but also encompasses hub transmissions that are designed for more than 3 speeds, for example 4, 5, 6, 7 or 8 speed stages. The hub transmission according to FIG. 1 is mounted to the rear wheel of a bicycle. The hub transmission basically includes a hub axle 10, a driver 11 and a hub shell 12 each of which are rotatably supported by the hub axle 10.

Figure 2:
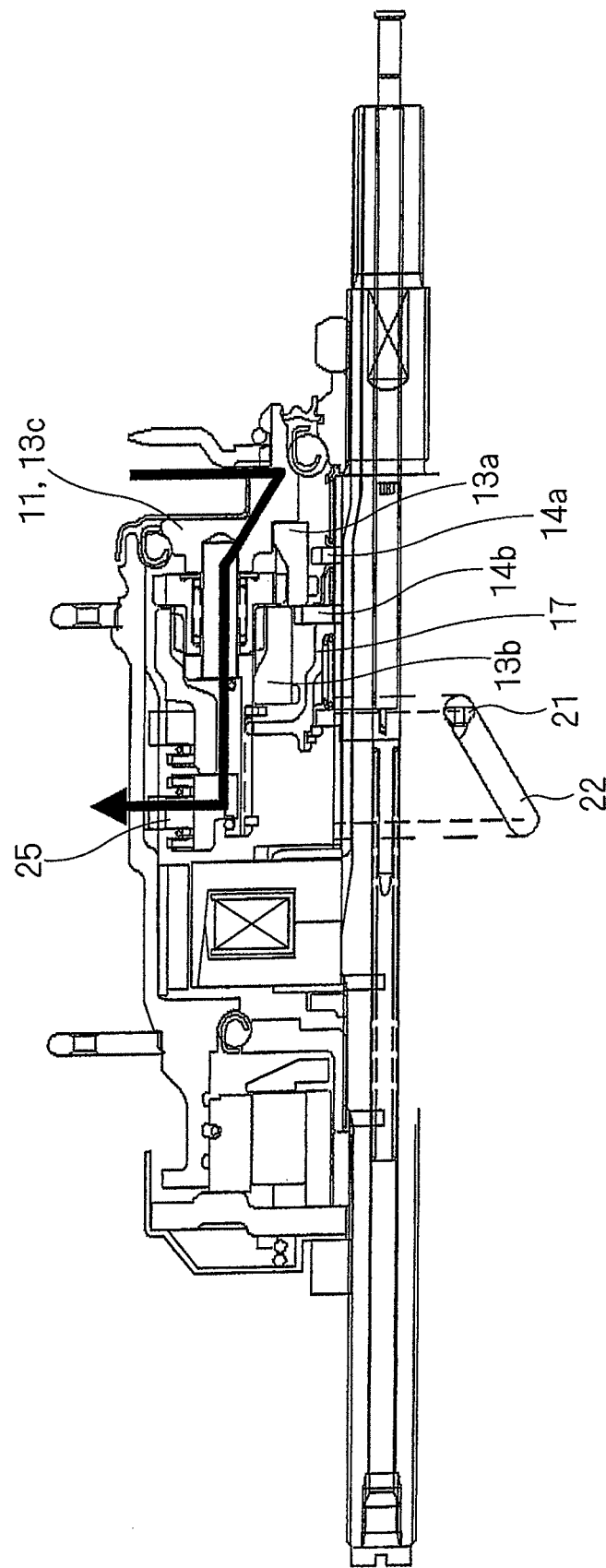
FIG. 2 is a simplified longitudinal cross-sectional view of the hub transmission illustrated in FIG. 1 with the clutch being in a first position and both sun gears being free.
Figure 3:
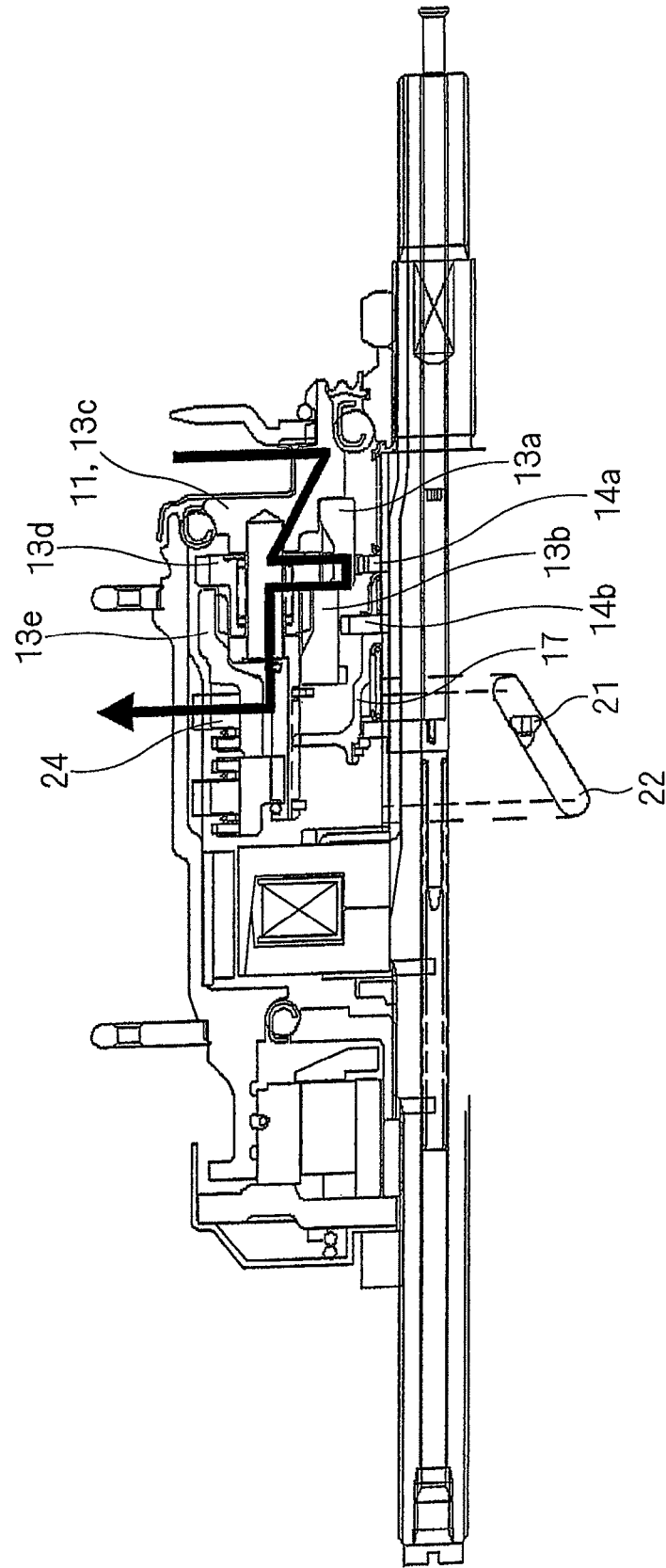
FIG. 3 is a simplified longitudinal cross-sectional view of the hub transmission illustrated in FIG. 1 with the clutch being in a second position and the first sun gear being locked.
Figure 4:
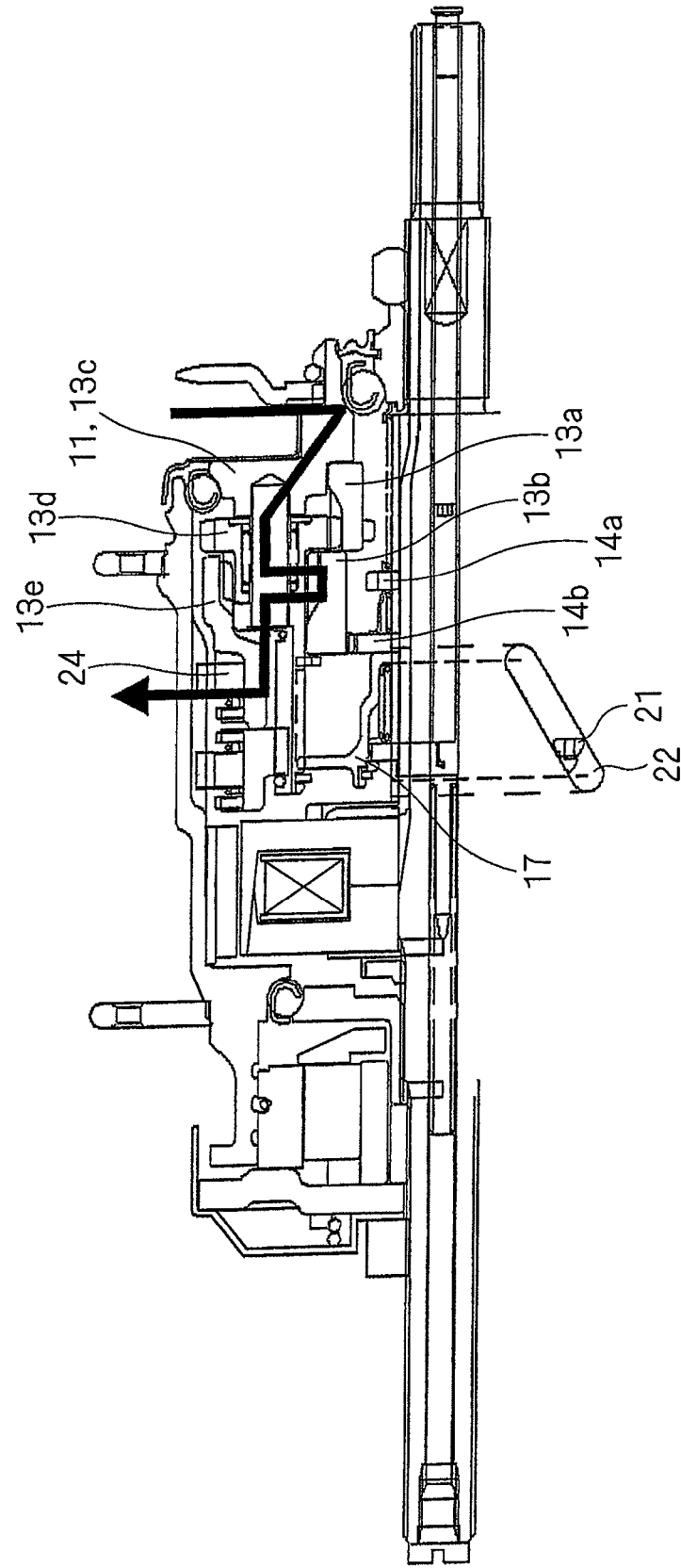
FIG. 4 is a simplified longitudinal cross-sectional view of the hub transmission illustrated in FIG. 1 with the clutch being in a third position and the second sun gear being locked.

The hub transmission further includes a planetary gear mechanism 13 which is disposed between the driver 11 and the hub shell 12. The planetary gear mechanism 13 transmits rotational power from the driver 11 to the hub shell 12 through a plurality of power transmission paths which can be selectively actuated to select the desired gear ratio as seen in FIGS. 2 to 4.

The planetary gear mechanism 13 basically includes a plurality (two) of sun gears 13a and 13b, a planet gear carrier 13c, three planet gears 13d and a ring gear 13e. The invention is not restricted to a planetary gear mechanism comprising two sun gears but also includes gear mechanisms with more than two sun gears, for example three or four sun gears. Moreover, only one sun gear can be provided. The sun gears 13a and 13b are concentrically arranged with respect to the hub axle 10 and are free to rotate, when in an unlocked state as explained below.

The sun gears 13a and 13b mesh with the planet gears 13d that are arranged on the peripheral surface of the sun gears 13a and 13b. In the illustrated embodiment, three planet gears 13d are used, for example. Each of the planet gears 13d is rotatably supported by the planet gear carrier 13c. In the present embodiment, the planet gear carrier 13c is integrally formed with the driver 11 and includes a plurality of pins 13g each of which are supported by the driver 11.

The invention is not restricted to the integral design of the driver 11 and the planet gear carrier 13c. Other configurations, wherein the planet gear carrier 13c and the driver 11 are separate components are likewise encompassed by the invention. Each of the planet gears 13d has at least two different engaging portions having different diameters. A large diameter engaging portion of each of the planet gears 13d is engaged with the first sun gear 13a and a small diameter engaging portion of each of the planet gears 13d is engaged with the second sun gear 13b.

The ring gear 13e of the planetary gear mechanism 13 meshes with the planet gears 13d. In particular, the ring gear 13e meshes with the small diameter engaging portion of each of the planet gears 13d.

To communicate rotational power from the planetary gear mechanism 13 to the hub shell 12, two clutches 24 and 25 are provided. A first clutch 24 couples the ring gear 13e with the hub shell 12. A second clutch 25 couples the planet gear carrier 13c/driver 11 with the hub shell 12. Both clutches 24 and 25 are configured as one-way pawl-clutches. Other types of one-way clutches are possible, for example slip clutches or roller clutches.

For actuating the planetary gear mechanism 13, a clutch 14 is preferably provided with two clutch plates 14a and 14b. The clutch plates 14a and 14b are non-rotatably supported with respect to the hub axle 10 and axially movable relative to the hub axle 10. The clutch plates 14a and 14b can be engaged with and disengaged from the sun gears 13a and 13b of the planetary gear mechanism 13, respectively.

Depending on the number of sun gears, any other number of clutch plates, for example three, four or even more clutch plates can be provided. Moreover, it is also possible to provide only one clutch plate which can be alternatively engaged with two sun gears 13a and 13b. If several clutch plates are provided, at least one of these clutch plates is non-rotatably supported by the hub axle 10 and axially movable relative to the hub axle 10. In the present embodiment, both of the clutch plates 14a and 14b are non-rotatably but axially movable with respect to the hub axle 10.

The clutch plates 14a and 14b can each be formed as rings with an engaging portion 13f provided on its outer peripheral surface of each ring of the clutch plates 14a and 14b, respectively. The engaging portions 13f of the clutch plates 14a and 14b can be projections, teeth or serrations. Other forms of clutch plates 14a and 14b are possible. The engaging portions 14c of the clutch plates 14a and 14b cooperate in an engaged state with corresponding engaging portions 13f provided on each of the inner peripheral surfaces of the sun gears 13a and 13b.

As seen in FIG. 1, the engaging portions 13f are arranged distant from the driver 11 that is on a left side of each of the sun gears 13a and 13b in FIG. 1. To guarantee that only one of the clutch plate 14a and 14b is engaged with one sun gear 13a and 13b at the same time, the distance between the engaging portion 13f of the first sun gear 13a and the first clutch plate 14a, at least in an initial state, is smaller than the distance between the engaging portion 13f of the second sun gear 13b and the second clutch plate 14b.

Moreover, the distance between the respective engaging portions 14c is selected so that the first sun gear 13a and the first clutch plate 14a are disengaged when the second sun gear 13b and the second clutch plate 14b are engaged.

The hub axle 10 is provided on its outer peripheral surface with a guiding part 15 which, in the present embodiment, are realized as a plurality of serrations 15a. Other types of guiding part are possible, for example at least one longitudinal projection that extends in the axial direction of the hub axle 10. Alternatively, at least one recess can be provided in the outer peripheral surface of the hub axle 10 in a longitudinal direction thereof.

The inner peripheral surface of each of the clutch plates 14a and 14b is correspondingly configured to be engaged with the guiding part 15, specifically with the serration 15a. The serrations 15a allow the clutch plates 14a and 14b to axially move along the hub axle 10 and prevent a rotational movement of the clutch plates 14a and 14b. Therefore, if one of the clutch plates 14a and 14b is engaged with one of the sun gears 13a and 13b, the respective sun gear 13a and 13b is coupled to the hub axle 10, and thus, is locked.

Figure 5:
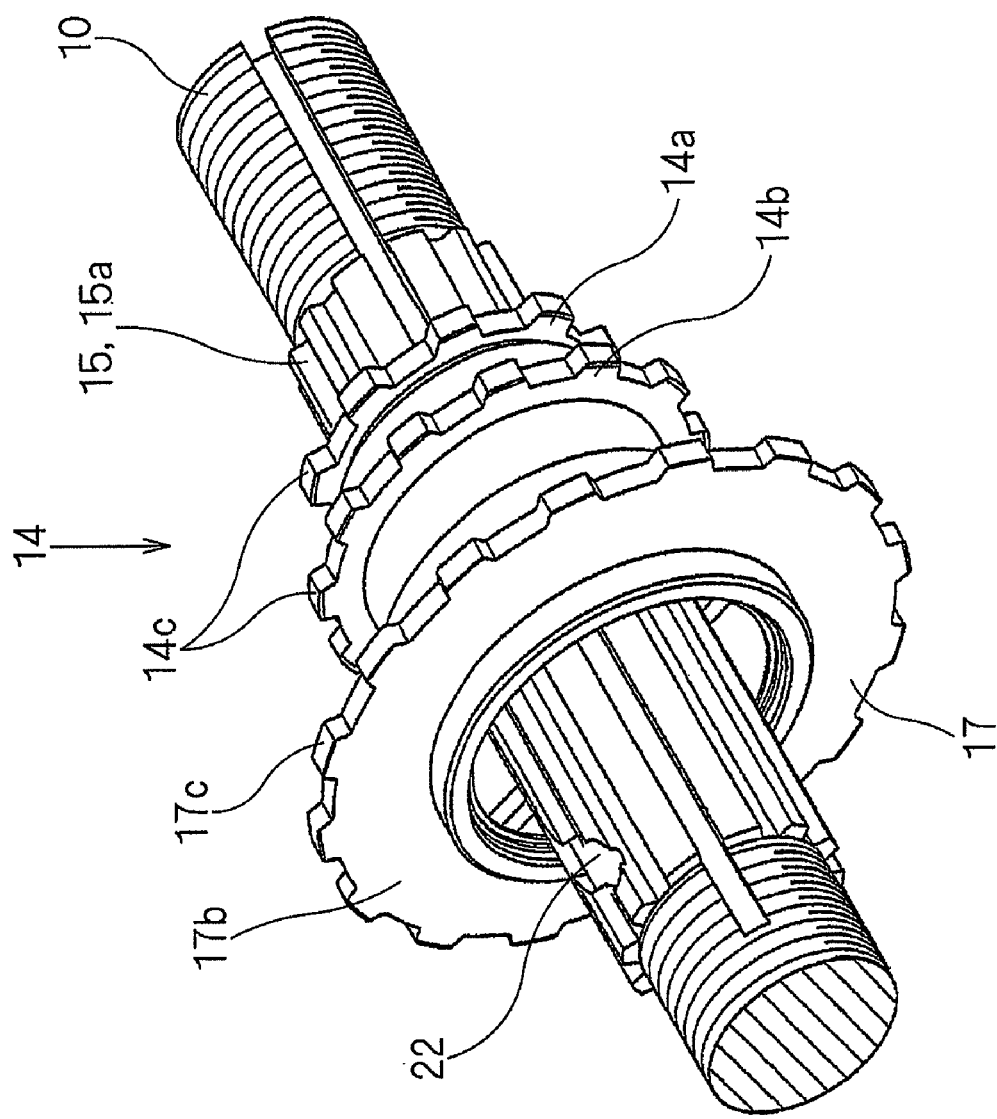
FIG. 5 is a perspective view of the clutch for the hub transmission illustrated in FIG. 1.

The configuration of the clutch 14 is also shown in the perspective view of FIG. 5. As illustrated in FIG. 5, the first and second clutch plates 14a and 14b of the clutch 14 are arranged on the hub axle 10 in an axial direction thereof. Adjacent to the second clutch plate 14b, the shift sleeve 17 is arranged on the hub axle 10 such that each of the first and second clutch plates 14a and 14b and the shift sleeve 17 concentrically surround the hub axle 10. Furthermore, it can be readily seen from FIG. 5 that the clutch plates 14a and 14b each have a ring shaped configuration with the engaging portions 13f configured for engagement with the respective sun gears 13a and 13b. The engaging portions 13f are formed on the outer peripheral surface of each of the ring shaped or annular clutch plates 14a and 14b.

As illustrated in FIG. 5, the engaging portions 13f of the first and second clutch plate 14a and 14b are configured as serrations. The same holds for the outer peripheral surface of the radial projection 17b of the shift sleeve 17 which is likewise configured with serrations. The serrations or generally the engaging portion 17c of the radial projection 17b are provided for engagement with the inner peripheral surface of the planet gear carrier 13c which is formed in a complementary manner to the serrations or engaging portion 17c on the radial projection 17b of the shift sleeve 17.

As further illustrated in FIG. 5, the outer peripheral surface of the hub axle 10 is at least partially provided with the guiding part 15, specifically with the serrations 15a. The axial length of the serrations 15a is adapted to allow a sufficient axial movement of the shift sleeve 17, the first clutch plate 14a and the second clutch plate 14b to meet the engagement/disengagement function of the clutch 14.

The axial movement of the clutch plate 14a and 14b is realized by first and second springs 16a and 16b. The first spring 16a is disposed between the first clutch plate 14a and a lock nut 26 connected to the hub axle 10 on the side of the driver 11 of the hub transmission. Thus, the first clutch plate 14a is biased in a direction away from the driver 11. The second spring 16b is provided between the first and second clutch plates 14a and 14b which biases the second clutch plate 14b in a direction away from the driver 11. The second clutch plate 14b is pushed by the second spring 16b against a stopper 17a of the shift sleeve 17 which is at least axially movable supported by the hub axle 10.

In the present embodiment, the shift sleeve 17 is also rotatably supported by the hub axle 10. The shift sleeve 17 has the function to control the axial movement of the second clutch plate 14b and of the first clutch plate 14a. To this end, the shift sleeve 17 is coupled with a shift mechanism 18 comprising a key member 21 which is arranged in a guide groove 22 in the hub axle 10 and radially projects from the guide groove 22. A rod 23 is arranged in a longitudinal bore in the hub axle 10 and is attached to the key member 21.

The rod 23 and the key member 21 can be axially moved along the hub axle 10. The key member 21 is coupled with the shift sleeve 17 in an axial direction so that the shift sleeve 17 can be moved in an axial direction away from the driver 11 by a corresponding movement of the key member 21 and the rod 23. Another arrangement of the shift mechanism 18 is also envisaged, wherein the shift sleeve 17 can be pushed in the opposite direction.

Since both of the clutch plates 14a and 14b are biased against the shift sleeve 17, the clutch plates 14a and 14b follow an axial movement of the shift sleeve 17 in an axial direction away from the driver 11 caused by the shift mechanism 18. Thus, the shift sleeve 17 can be moved from the first position I into a second position II and eventually into a third position III as evident from FIG. 1. The three positions I, II, III correspond to the three shifting stages which can be realized by the hub transmission according to FIG. 1 which are illustrated in FIGS. 2, 3 and 4.

To return the clutch mechanism 14 from the second position II or the third position III into the first position I, a third spring 16d is provided in the bore of the hub axle 10 which biases the rod 23 in a direction towards the driver 11. That is, if the rod 23 is released, the spring 16d pushes the rod 23 back to the initial position. To assist the down shifting operation, a rotation conversion structure 19 is provided that applies an axial force on the shift sleeve 17 and eventually on the clutch plate 14b and the clutch plate 14a in a direction opposite to the biasing direction of the first and second springs 16a and 16b. The rotation conversion structure 19 comprise a cam portion 20 which is formed on an inner peripheral surface of the shift sleeve 17 and which is adapted to be engaged with the key member 21.

The cam portion 20 includes an inclined contact surface which cooperates with the key member 21 so that a rotational movement of the shift sleeve 17 is converted into an axial movement of the shift sleeve 17. The rotational movement of the shift sleeve 17 is caused by a radial projection 17b which meshes with the planet gear carrier 13c and the driver 11 respectively. The shift sleeve 17 is formed with two steps, with a first step accommodating a fourth spring 16c disposed between the key member 21 and the shift sleeve 17. The fourth spring 16c forces the key member 21 away from the cam portion 20 to avoid that the key member 21 unintentionally engaging with the cam portion 20.

In the engaged state, the key member 21 forms a stationary counterpart that cooperates with the cam portion 20. To axially lock the key member 21, the guide groove 22 is inclined with respect to the longitudinal axis of the hub axle 10 as can be seen in FIG. 1 which shows a partial plan view of the guide groove 22. The inclined guide groove 22 can also be seen in FIG. 5. The invention is not restricted to the inclined guide groove according to FIG. 1 or 5, but can also comprise other arrangements that allow axially locking of the key member 21, when it is engaged with the cam portion 20.

The balance condition of the forces of the four springs used in the hub transmission according to the above structure will be explained in more detail below.

The force of the first spring 16a is greater than the force of the second spring 16b between the first and second clutch plate 14a and 14b. The force of the third spring 16d acting on the rod 23 is greater than the force of the fourth spring 16c between the key member 21 and the shift sleeve 17 which is greater than the sum of the forces of the first and second springs 16a and 16b.

Due to the compact design of the planetary gear mechanism which can be achieved by the invention, additional space is available in the hub transmission which can be used to accommodate other components, for example a dynamo 27 and/or a brake 28. This is readily apparent from FIG. 1. The invention also encompasses other embodiments, for example lightweight embodiments which include only a compact gear mechanism.

In the following, the operation of the hub transmission according to FIG. 1 is explained in more detail.

FIG. 2 illustrates the hub transmission in a first speed stage. As is apparent from FIG. 2, both sun gears 13a and 13b are free, since the clutch plates 14a and 14b are in the initial, disengaged position I. Therefore, the driving force is directly transmitted from the driver 11 via the one-way clutch 25 to the hub shell 12.

FIG. 3 illustrates the hub transmission in speed stage 2 (shift up). To shift from speed stage 1 (FIG. 2) to speed stage 2, the rod 23 is pushed from the outside of the internal hub transmission so that the key member 21 attached to the rod 23 is moved in the guide groove 22 from the initial position to the intermediate position shown in FIG. 3. Since the shift sleeve 17 is axially connected with the key member 21, the shift sleeve 17 is moved likewise, from the initial position to the intermediate position shown in FIG. 3.

Since the spring bias force of the first spring 16a is greater than the spring bias force of the second spring 16b, both of the clutch plates 14a and 14b are pushed and moved by the spring force of the first spring 16a to an intermediate position II, namely along the serrations 15a on the outer peripheral surface of the hub axle 10. In position II, the clutch plate 14a engages with the first sun gear 13a which is now fixed relative to the hub axle 10. In this state, the driving force is transmitted from the driver 11 to the hub shell 12 via the planetary gear mechanism 13. In particular, the driving force is transmitted from the driver 11 via the planet gears 13d which rotate around the first sun gear 13a, via the ring gear 13e and the clutch 24 to the hub shell 12.

FIG. 4 illustrates the hub transmission in speed stage 3 (shift up) when the rod 23 is further pushed from the outside of the internal hub transmission, shifting the key member 21 which is moved in the guide groove 22 to the final position III as indicated in FIG. 4. Together with the key member 21, the shift sleeve 17 is moved in an axial (and circumferential) direction until the final position III is reached.

Since the spring bias force of the first spring 16a is greater than the spring bias force of the second spring 16b, the clutch plates 14a and 14b are moved by the spring bias force of the first spring 16a to the position III along the serrations 15a. Accordingly, the engaging portion 14c of the first clutch plate 14a disengage from the engaging portion 13f of the first sun gear 13a, and the engaging portion 14c of second clutch plate 14b engage with the engaging portion 13f of the second sun gear 13b. Thus, the second sun gear 13b is now fixed relative to the hub axle 10. In this state, the driving force is transmitted from the driver 11 via the planet gears 13d which rotate around the second sun gear 13b, via the ring gear 13e and the clutch 24 to the hub shell 12.

In the following, an overview over the different positions of the shift sleeve and the transmission paths established thereby is given in Table 1.

TABLE 1

| Speed Stage | Position of the shift sleeve | Sun gear 1 16a | Sun gear 2 16b | Transmission path |
| --- | --- | --- | --- | --- |
| 1 | I (direct connection) | Free | Free | Driver 11 - Clutch 25 - Hub shell 12 |
| 2 | II (small speed-increasing) | Locked | Free | Driver 11 - Planet gear 13d rotates around sun gear 13a - Ring gear 13e - Clutch 24 - Hub shell 12 |
| 3 | III (large speed-increasing) | Free | Locked | Driver 11 - Planet gear 13d rotates around sun gear 13b - Ring gear 13e - Clutch 24 - Hub shell 12 |

During downshift operations from the third speed stage to the second speed stage, or from the second speed stage to the first speed stage, occasionally the clutch plates 14a and 14b and the associated sun gears 13a and 13b can remain meshing if high loads are applied during the shifting operation. In this case, the spring force of the third spring 16d alone is not sufficient to move the shift sleeve 17 to position II or I.

Then, the shift member 21 is moved relative to the shift sleeve 17 against the spring force of the fourth spring 16c between the key member 21 and the shift sleeve 17 until the key member 21 engages with the cam portion 20. Due to the inclined shape of the cam portion 20, a rotational movement of the shift sleeve 17 transmitted from the driver 11 via radial projection 17b is converted into an axial displacement of the shift sleeve 17 in a direction towards the driver 11. Due to the inclined shape of the guide groove 22, the key member 21 is axially locked if engaged with the cam portion 20. The resulting axial force pushes the clutch plate 14b and the clutch plate 14a into a direction towards the driver 11 even under high loads.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). For example, the invention is by not restricted to the three speed stage hub transmission according to FIGS. 1 to 4, but also envisages other hub transmissions with different numbers of speed stages, for example 4, 5, 6, 7 or 8 speed stages. Thus, the foregoing descriptions of the embodiments according to the present invention are provided for illustration only, and not for the purpose of limiting the invention as defined by the appended claims and their equivalents.

What is claimed is:

1. A bicycle hub transmission comprising:
a hub axle having a longitudinal guiding part that includes at least one serration on an outer peripheral surface of the hub axle;
a driver rotatably supported relative to the hub axle;
a hub shell rotatably supported relative to the driver,
a planetary gear mechanism operatively disposed between the driver and the hub shell to selectively transmit rotational power from the driver to the hub shell through one a plurality of different power transmission paths, and
a clutch arranged to actuate the planetary gear mechanism to select one a plurality of different gear ratios,
the clutch includes at least one clutch plate which is non-rotatably supported by the hub axle and axially movable relative to the hub axle to selectively engage with and disengage from at least one sun gear of the planetary gear mechanism, and the at least one serration engages a correspondingly formed inner peripheral surface of the clutch plate.

2. The bicycle hub transmission according to claim 1, wherein
the clutch includes an additional clutch plate which is non-rotatably supported to the hub axle and axially movable relative to the hub axle to selectively engage with and disengage from an additional sun gear of the planetary gear mechanism.

3. The bicycle hub transmission according to claim 1, wherein
the clutch plate is axially biased by a spring.

4. The bicycle hub transmission according to claim 1, further comprising
a shift sleeve at least axially movable relative to the hub axle and connected to a shift mechanism.

5. The bicycle hub transmission according to claim 4, wherein
the shift sleeve is rotatably movable relative to the hub axle.

6. The bicycle hub transmission according to claim 4, wherein
the shift sleeve includes a stopper for the clutch plate.

7. The bicycle hub transmission according to claim 5, wherein
a rotation conversion structure is configured to convert a rotational movement of the shift sleeve into an axial movement of the shift sleeve.

8. The bicycle hub transmission according to claim 7, wherein
the rotation conversion structure includes a cam portion provided on an inner peripheral surface of the shift sleeve and a key member which is connected to the shift mechanism and engageable with the cam portion.

9. The bicycle hub transmission according to claim 8, wherein
the key member is movably arranged in a guide groove which is formed in an outer peripheral surface of the hub axle and which is adapted to axially lock the key member in a state engaged with the cam portion.

10. The bicycle hub transmission according to claim 8, wherein
a spring is provided between the shift sleeve and the key member that biases the key member in a direction away from the cam portion.

11. The bicycle hub transmission according to claim 7, wherein
the shift sleeve is engaged with a planet gear carrier of the planetary gear mechanism.

12. The bicycle hub transmission according to claim 4, wherein
the shift mechanism includes a rod which is axially movably disposed in the hub axle and biased in a direction towards the driver.

* * * * *